(12) United States Patent  
Bruetsch et al.

(10) Patent No.: US 8,167,632 B2
(45) Date of Patent: May 1, 2012

(54) BUS BAR

(76) Inventors: Friedbert Bruetsch, Tuttlingen (DE); Ronald Dold, Schönwald (DE)

(*) Notice: Subject to any disclaimer, the term of this patent is extended or adjusted under 35 U.S.C. 154(b) by 30 days.

(21) Appl. No.: 12/796,339

(22) Filed: Jun. 8, 2010

(65) Prior Publication Data

US 2011/0287645 A1 Nov. 24, 2011

(30) Foreign Application Priority Data

May 19, 2010 (DE) .................. 20 2010 006 964 U

(51) Int. Cl.
*H01R 25/00* (2006.01)
(52) U.S. Cl. ....................... 439/114; 439/212
(58) Field of Classification Search .......... 439/112–115, 439/211–212
See application file for complete search history.

(56) References Cited

U.S. PATENT DOCUMENTS

| | | | |
|---|---|---|---|
| 6,012,937 A * | 1/2000 | Campbell et al. | 439/212 |
| 6,086,389 A * | 7/2000 | Wagener | 439/114 |
| 7,517,235 B2 * | 4/2009 | Bagewadi et al. | 439/114 |

FOREIGN PATENT DOCUMENTS

| | | |
|---|---|---|
| DE | 20 2006 016 750 | 2/2007 |
| DE | 20 2008 002 352 | 6/2008 |
| DE | 20 2009 013 790 | 3/2010 |

* cited by examiner

*Primary Examiner* — Khiem Nguyen
(74) *Attorney, Agent, or Firm* — Andrew F. Young, Esq.; Lackenbach Siegel, LLP

(57) ABSTRACT

A collecting rail system provides a bus bar with a floor part and a cover part made from an isolating material. The floor part features at least two chambers for the accommodation of respectively one terminal track, whereby between respectively two chambers a chamber separating wall is disposed, and whereby connector tabs are disposed on the terminal tracks such that the cover part can be placed on the floor part in such a manner that the terminal tracks are covered up and the connector tabs protrude through openings in the cover part. As a result of this arrangement, the floor part as well as the cover part are manufactured by means of an operative extrusion process and the openings are subsequently placed, in particular stamped, into the cover part, whereby an isolating element, which is insertable into an opening and which penetrates, in the inserted state, through the opening and which features a case. The case is disposed with which is at least one separating wall, preferably two separating walls, which are positioned between two neighboring connector tabs when the cover part is placed on the floor part and the isolating element is inserted into the opening.

11 Claims, 4 Drawing Sheets

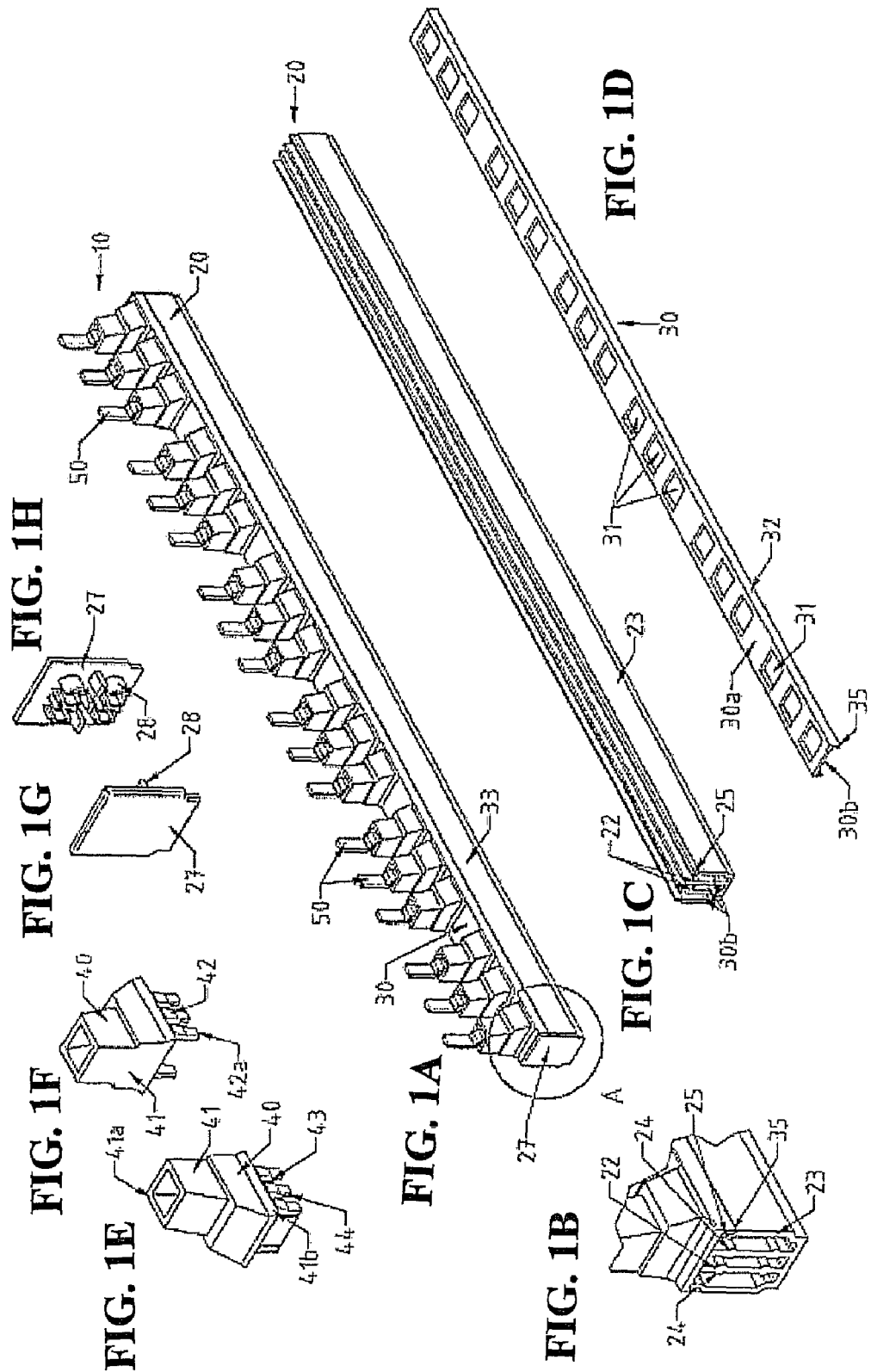

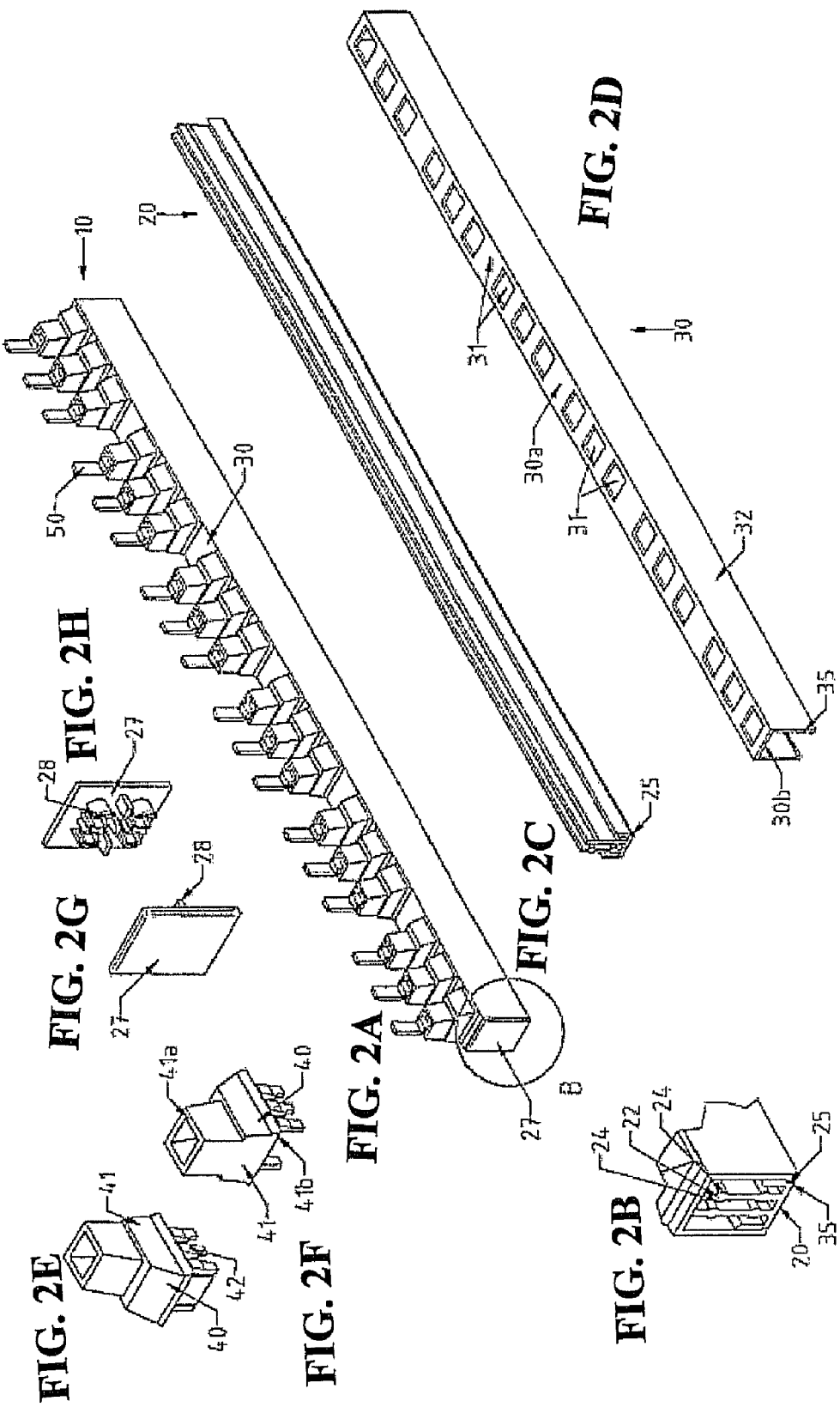

BUS BAR

CROSS REFERENCE TO RELATED APPLICATIONS

This application relates to, and claims priority from, DE 20 2010 006 964.5 filed May 19, 2010, the entire contents of which are incorporated herein fully by reference.

FIGURE FOR PUBLICATION

FIG. 1A.

BACKGROUND OF THE INVENTION

1. Field of the Invention

The present invention relates to a bus bar for use in phased feed electrical distribution. More specifically, the present invention relates to a bus bar, and the process for making the same, having a floor part and a cover part. The floor part comprises at least two chambers for the accommodation of a terminal track, and between the chambers is a chamber separating wall, whereby connector tabs are disposed on the terminal track. The cover part is made from an isolating material, and can be placed on the floor part in such a manner that the terminal track is covered up and the connector tabs protrude through corresponding openings in the cover part.

2. Description of the Related Art

The related art involves bus bars for the simultaneous phased feed of several switching devices disposed in parallel in an electrical distribution installation. Such bus bars feature in particular a floor part and a cover part made from an isolating material, whereby the floor part features at least two chambers for the accommodation of respectively one terminal track, whereby between respectively two chambers a chamber separating wall is disposed, whereby connector tabs are disposed on the terminal tracks and whereby the cover part can be placed on the floor part in such a manner that the terminal tracks are covered up and the connector tabs protrude through openings in the cover part. Such bus bars are for example shown in: DE 20 2006 016 750 U1; DE 20 2008 002 352 U1; as well as in DE 20 2009 013 790 U1.

The terminal tracks lie in the chambers and insulated from one another by means of the chamber separating walls, whereby however the connector tabs protrude beyond the chamber separating walls.

In the case of such bus bars with at least two terminal tracks, care has to be taken that the air path between the electrically conducting parts is sufficient to prevent a flashover. Furthermore the air path between electrically conducting parts and the outer surface of the housing must be large enough to exclude the danger that a person comes in contact with conducting parts. If applicable such bar buses must satisfy the requirements of the American UL 508 which requires an air path of at least 1 inch and a creeping distance of at least 2 inches in the case of such components. The air path is thereby defined as the shortest distance in the air between two conducting parts. The creeping distance is defined as the shortest distance along the surface of an insulating material between two conducting parts.

What is not appreciated by the prior art is that in the case of the known bus bars the cover part is manufactured using an injection molding process. If different spacings of the connector tabs are to be realized, different injection molding parts for the different spacings of the connector tabs have to be kept available, which causes high production costs.

Accordingly, there is a need for an improved bus bar that can be manufactured cost-effectively.

ASPECTS AND SUMMARY OF THE INVENTION

An aspect of the present invention is to provide a bus bar that can be manufactured cost-effectively.

The bus bar according to the invention has a floor part and a cover part made from an isolating material, whereby the floor part features at least two chambers for the accommodation of respectively one terminal track, whereby between respectively two chambers a chamber separating wall is disposed, whereby connector tabs are disposed on the terminal tracks and whereby the cover part can be placed on the floor part in such a manner that the terminal tracks are covered up and the connector tabs protrude through openings in the cover part, is characterized in that the floor part as well as the cover part are manufactured by means of an extrusion process and subsequent to the extrusion process the openings are placed, in particular stamped, into the cover part. The manufacture of the cover part in the extrusion process and the subsequent placement of the openings in the cover part that was manufactured in the extrusion process has the advantage that for different spacings for connector tabs the cover part can be adapted by simple means, namely by placing the openings at the corresponding distance in the cover part, however no different cover parts in different injection molds have to be kept ready, but only for example the control of the automation procedure, with the aid of which the openings are placed in the cover part, has to to adapted to the changed spacings of the connector tabs and therefore the changed spacings of the openings.

According to an embodiment of the present invention, an isolating element can be inserted into an opening, which penetrates, in the inserted state, through the opening and which features a case, disposed with which is at least one separating wall, preferably two separating walls, which are positioned between two neighboring connector tabs when the cover part is placed on the floor part and the isolating element is inserted into the opening. The case insulates the connector tab that penetrates through the opening in the cover part in the exterior area, on the one side in regard to the neighboring connector tabs and on the other in regard to an operator, while the separating walls insulate the connector tabs in the interior area of the bus bar against one another so that by these means the desired air paths and creeping distances can be achieved. It is thereby essential that only one type of insulating element has to be kept ready, even if the connector tabs are disposed in variable spacings from each other, which lowers production costs noticeably.

Preferably, the case features a lower edge that can be inserted in an interlocking manner into the opening in order to thereby preferably completely close the opening.

According to another embodiment of the invention the case is, in the inserted state of the insulating element, disposed essentially on the exterior side of the cover part and the separating wall is disposed essentially on the interior side of the cover part.

The separating wall preferably features a length such that a lower edge, which faces away from the case, of the separating wall abuts against an edge of the of the terminal track that faces the case, when the cover part is placed on the floor part and the insulation element is inserted in the opening. An insulation of neighboring connector tabs against one another is thereby implemented without increasing the creeping distance.

Usually, the chamber separating walls protrude beyond the terminal tracks in the direction of the cover part in order to already increase the creeping distance between the terminal tracks by these means. In order for the separating wall to still be able to reach to the edge of the terminal track that is facing the cover part, a slit is preferably provided in the separating wall, starting from a lower edge, into which the chamber separating wall engages when the cover part is placed on the floor part and the insulating element is placed in the opening.

Since known bus bars can feature not only two, but also three or four terminal tracks, the separating wall features preferably a number of slits that corresponds to the number of chamber separating walls.

Preferably, the cover part locks in on the floor part in order to assure a reliable fixation of the cover part on the floor part.

According to another aspect of the present invention, the separating wall interlocks at the chamber separating wall when the cover part is placed on the floor part and the insulating element is inserted into the opening in order to assure a reliable fixation. The chamber separating wall features particularly preferred a locking protrusion which engages a corresponding recess in the slit of the separating wall in order to assure a space-saving disposition of the locking joint by these means. A particularly optimal fixation results if, according to an advantageous embodiment of the invention, the chamber separating wall features, on its side surfaces facing each other, respectively a locking protrusion which engages corresponding recesses in the slit in the separating wall.

Preferably, the floor part is, on its front side, closable by means of two sealing caps in order to assure a complete insulation of the terminal tracks also on the front sides.

The process, according to the invention, of the manufacture of the bus bar, which features a floor part and a cover part made from an insulating material, whereby in the cover part openings are disposed, through which connector tabs, which are disposed in the bus bar, are guided, features the following steps: Initially the floor part and the cover part are manufactured in the extrusion process. Subsequently the openings are placed in the cover part. By these means the floor part and the cover part can be manufactured cost-effectively, also for variable spacings of the connector tabs since different cover parts do not have to be manufactured with the injection molding process with different injection molds, instead the adaption of the spacings of the openings can be implemented in the process step of the placement of the openings in the cover part.

In another aspect of the inventive process there is disclosed the stamping of the openings into the cover part, which on the one hand is a cost-effective manufacturing process and on the other makes a variation of the spacings of the openings possible.

The above, and other aspects, features and advantages of the present invention will become apparent from the following description read in conjunction with the accompanying drawings, in which like reference numerals designate the same elements.

BRIEF DESCRIPTION OF THE DRAWINGS

FIG. 1A is a perspective view of a first embodiment example of a bus bar according to the present invention.

FIG. 1B is an enlargement of a section from FIG. 1A without the sealing cap and without the terminal tracks.

FIG. 1C is a perspective view of the floor part of the bus bar according to FIG. 1A.

FIG. 1D is a perspective view of the cover part of the bus bar according to FIG. 1A.

FIG. 1E is a perspective view of an insulating element of the bus bar according to FIG. 1A.

FIG. 1F is a further perspective view of the insulating element according to FIG. 1E.

FIG. 1G is a perspective view of a sealing cap of the bus bar according to FIG. 1A.

FIG. 1H is an additional perspective view of the sealing cap according to FIG. 1G.

FIG. 2A is a perspective view of a second embodiment example of a bus bar according to the invention.

FIG. 2B is an enlargement of a section from FIG. 2A without sealing cap and without terminal tracks.

FIG. 2C is a perspective view of the floor part of the bus bar according to FIG. 2A.

FIG. 2D is a perspective view of the cover part of the bus bar according to FIG. 2A.

FIG. 2E is a perspective view of an insulating element of the bus bar according to FIG. 2A.

FIG. 2F is a further perspective view of the insulating element according to FIG. 2E.

FIG. 2G is a perspective view of a sealing cap of the bus bar according to FIG. 2A.

FIG. 2H is an additional perspective view of the sealing cap according to FIG. 2G.

DETAILED DESCRIPTION OF THE PREFERRED EMBODIMENTS

Figure 1I:
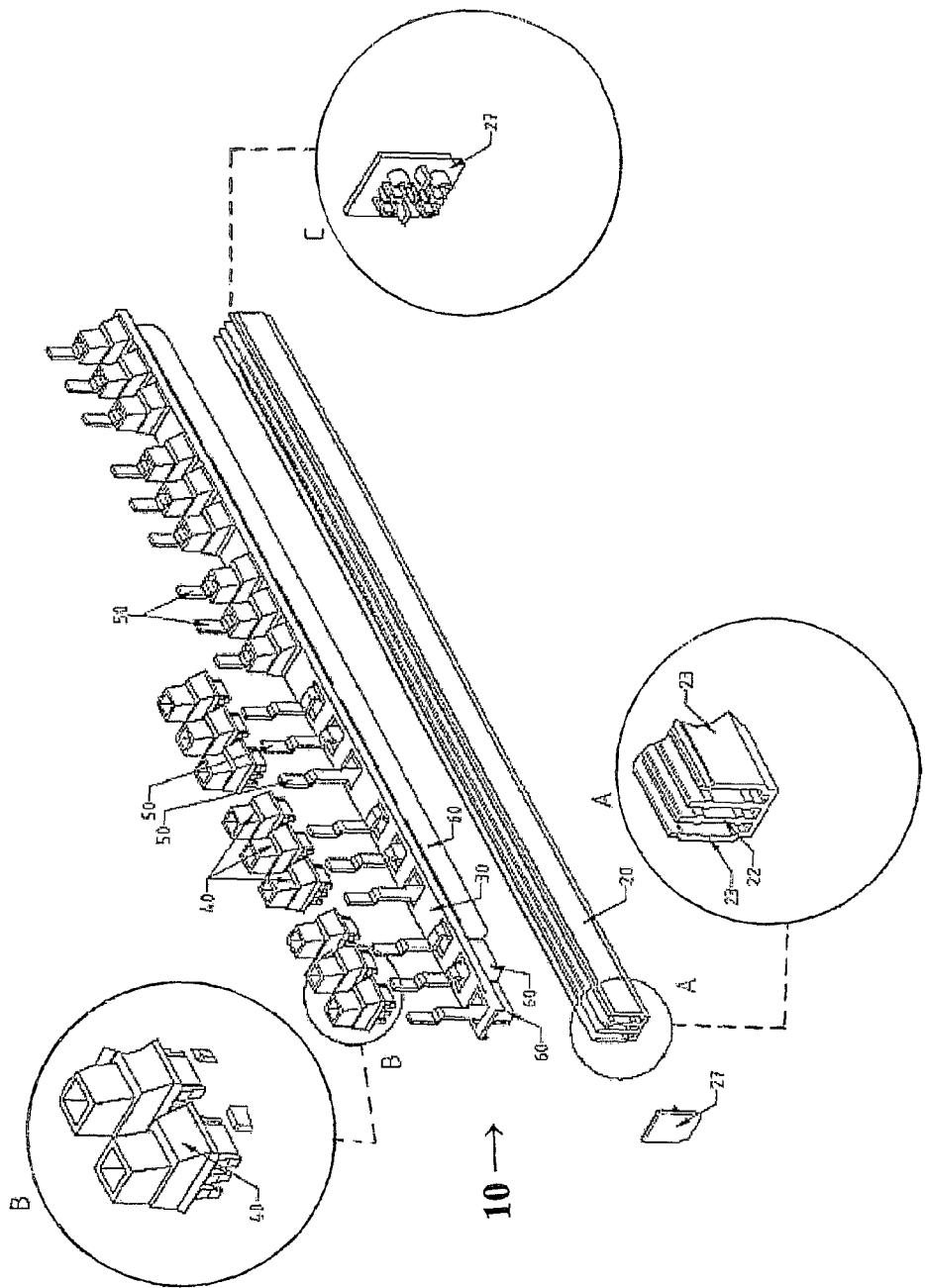
FIG. 1I is an exploded view with enlargement of a section of the bus bar according to FIG. 1A.
Figure 1K:
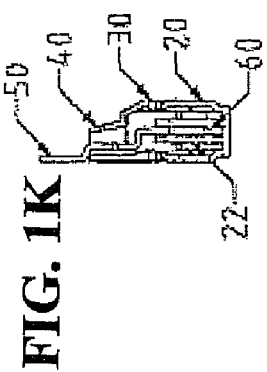
FIG. 1K is a cut along the A-A in FIG. 1J.
Figure 1J:
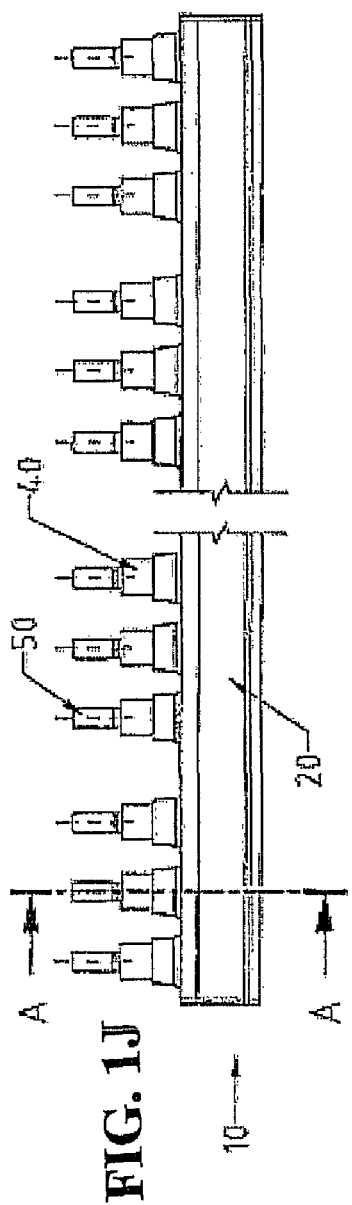
FIG. 1J is a side view of the bus bar according to FIG. 1A.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

The FIGS. 1A to 1K present different views of a bus bar 10 and its details, whereby identical reference symbols always label identical parts, for purposes of improved clarity however not all reference symbols are indicated in all figures.

The bus bar 10 features a floor part 20 as well as a cover part 30. The floor part 20 and the cover part 30 are manufactured from an insulating material.

The floor part 20 features three chambers 21 that are each separated from each other by a chamber separation wall 22 (compare FIG. 1C). In particular the floor part 20, as present, features two chamber separating walls 22. The outer chambers 21 in addition feature respectively one side wall 23.

The floor part 20 is manufactured as an extrusion profile and therefore can be sized to any length. The floor part 20 is closed on its face sides respectively by means of a sealing cap 27 (compare FIGS. 1G and 1H) On the interior side of the sealing cap 27 protrusions 28 are disposed that engage into the face sides of the chambers 21 in an interlocking manner in order to, on the one side, hold the sealing caps 27 in the floor part 20 by these means in a clamping manner, and to, on the other, additionally increase the air path and creeping distance.

In the chambers 21, is respectively a terminal track 60, placed so that the bus bar 10 features three terminal tracks 60. The chamber separating walls 22 thereby overtop the upper edge of the terminal tracks 60 in order to, by these means, correspondingly increase the air path and creeping distances between the terminal tracks 60. On every terminal track 60 are several connector tabs 50 disposed in a manner as to be spaced in the longitudinal direction; these tabs are sticking out essentially vertically from the terminal track 60 and protrude beyond the chamber separating walls 22 out of the floor part 20.

Above the chamber separating walls 22, the connector tabs 50 are bent at an angle in such a way that all open ends of the connector tabs 50 of the three terminal tracks 60 lie in one plane and are flush with one another (compare especially FIGS. 1A and 1I). The connector tabs 50 of the terminal tracks 60 are thereby spaced relative to each other in such a manner that every third connector tab 50 is disposed at the same terminal track 60. In order to indicate on the outside which connector tabs belong with which terminal track 60, it is possible to provide a larger spacing between respectively three connector tabs. Also, the spacing between the individual connector tabs 50 can be varied from bus bar to bus bar.

In order to be able to cover the terminal tracks 60 in an upward direction, the cover part 30 is placed on top of the floor part 20. The cover part 30 features several openings 31 by means of which the open ends of the connector tabs 50 stick out of the cover part 30 so that the connection for example to an installation machine can be implemented via the open ends of the connector tabs 50. The openings 31 feature thereby especially entirely the same form and size.

A clamping or locking mechanism can be provided for the attachment of the cover part 30 on the floor part 20. In the case of the embodiment example presented in FIGS. 1A to 1K, the floor part 20 features a latching edge 25 in the upper area of the side walls 23, while the cover part 30 overlaps the floor part 20 with an edge 32 on the side walls 23, whereby a latching edge 33 is disposed on the interior side of the edge 32 that can be made to engage with the latching edge 25 of the side walls 23 of the floor part 20.

The cover part 30 is also manufactured in the extrusion process, whereby the openings 31 are subsequently placed, for example, by means of stamping. Usually the openings 31 are stamped in the longitudinal direction of the cover part 30 chronologically sequentially so that by means of variation either of the feed of the cover part 30 or the chronological sequence of the stampings a variable spacing of the openings 31 can be implemented in a cost-effective manner. The connector tabs 50 protrude through the openings 31 from the bus bar 10 toward the exterior.

In order to increase the air path and creeping distance between the connector tabs, insulating elements 40 are inserted into the openings 31. An insulating element 40 is thereby particularly provided for every opening 31. The insulating elements 40 are particularly respectively identical relative to one another. The insulating elements 40 feature each a case 41 and at least one, presently two separating walls 42. Once the insulating element 40 is inserted into the opening 31 of the cover part 30, the insulating element 40 penetrates through the opening 31 of the cover part 30. In particular the case 41 is thereby disposed primarily on the exterior side 30a of the cover part 30, while the separating walls 42 are disposed primarily in the interior space of the bus bar 10 or an interior side 30b of the cover part 30.

The case 41 features an upper edge 41a and a lower edge 41b. The upper edge encloses an opening through which the connector tabs 50 protrude from the case 41. The lower 41b of the case 41 can be placed in an interlocking manner onto the opening 31 of the cover part 30. The opening 31 is thereby closed in such a manner that the air paths and creeping distances are increased up to the upper edge 41a of the case 41. The case 41 of the insulating element 40 insulates therefore the connector tabs 50 on the exterior side 30a of the cover part 30 of the bus bar 10 against one another.

The openings 31 can be implemented so as to be round, rectangular or square. Also, the cross section of the case 41 can be implemented so as to be round, rectangular or square. The case 41 tapers preferably, starting from the lower edge 4b to the upper edge 41a, in order to on the one hand further improve the insulation of the connecting tabs 50, on the other hand however be able to completely cover up openings 31, which extend over almost the entire width of the cover part 30 in order to make connector tabs 50 placed at different terminal tracks 60 accessible.

The separating walls 41 run, in the state where the insulating element 40 is inserted into the opening 31, primarily vertical to the cover part 30 and furthermore primarily perpendicular to the chamber separating walls 22.

The separating walls 42 each feature a lower edge 42a that faces away from the case 41. The separating walls 42 can feature a length such that the lower edge 42a abuts against the edge of the terminal tracks 60 either directly or with minor clearance when the insulating element 40 is inserted into the opening 31 of the cover part 30 and the cover part 30 is placed on the floor part 20, said separating walls can however also feature such a length that the lower edge 42a ends up being positioned with spacing above the edge of the terminal tracks 60.

Since the chamber separating walls 22 usually overtop the terminal tracks 60, the separating walls 42 feature a number of slits 43, which corresponds to the number of chamber separating walls 22, into which the chamber separating walls 22 engage when the insulating element 40 is inserted into the opening 31 of the cover part 30 and the cover part 30 is placed on the floor part 20. Predominantly, the separating walls 42 feature each two slits 43.

On both side walls of the chamber separating walls 22 is, respectively, a locking protrusion 24 disposed which is implemented in the longitudinal direction in an end-to-end manner. The slits 43 of the separating walls 42 feature corresponding recesses 44 into which the locking protrusions 24 of the chamber separating walls 22 engage when the insulating element 40 is inserted into the opening 31 of the cover part 30 and the cover part 30 is placed on the floor part 20 so that the separating walls 42 interlock on the chamber separating walls 22. This interlocking mechanism can represent the interlocking mechanism between the floor part 20 and the cover part 30 or can be provided in addition to the connection mechanism between the floor part 20 and the cover part 30. By means of the separating walls 42, the air paths and creeping distances between the connector tabs 42 and the interior of the bus bar are distinctly increased.

The bus bar 10 is manufactured in particular as follows. Initially the floor part 20 and the cover part 30 are manufactured in an extrusion process and therefore can in particular be sized to any length. Subsequently, the openings 31 are placed, in particular stamped, into the cover part 30, whereby arbitrary spacings between the individual openings 31 can be realized by simple means, for example through the variation of either the feed of the cover part 30 or the chronological sequence of the stampings. The terminal tracks 60, with the connector tabs disposed therein, are placed in the chambers 21 of the floor part 20 and the cover part 30 is placed on the floor part whereby the connector tabs 50 are guided through the openings 31 of the cover part 30. Subsequently, an insulating element 40 is placed on each opening 31 and the front sides of the floor part 20 and/or the cover part 30 are closed with the sealing caps 27.

In FIGS. 2A to 2H, a further embodiment is represented which distinguishes itself from the embodiment example of the bus bar 10 represented in the FIGS. 1A to 1H only in the type of attachment of the cover part 30 on the floor part 20. Otherwise, the same reference symbols refer to functionally equivalent parts. The second embodiment example of the bus bar 10 features a floor part 20 whose side walls 23 are shorter than the chamber separating walls 22 while the cover part 30 features edge walls 32 that add to the side walls 23 of the bottom part 20 and completely overlap these. The latching edge 35 of the cover part 30 interlocks thereby with a latching edge 25 that is disposed in the floor area of the floor part 20 (compare especially FIG. 2B)).

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A bus bar comprising:
at least one bus bar with a floor part and a cover part each made from an operative electrically isolating material;
said floor part including at least two chambers operable for the accommodation of respectively one terminal track, whereby between respectively said at least two chambers a chamber separating wall is disposed;
a plurality of connector tabs disposed on the terminal tracks, whereby the cover part is operatively placeable on the floor part in such a manner that the terminal tracks are protectively covered from unintended contact and the connector tabs protrude through respective openings in the cover part; and
a plurality of isolating elements; each insertable into an operative opening and which penetrates, in an inserted state, through the opening and which features a case, disposed with which is at least one separating wall, preferably two separating walls, which are positioned between respective said two neighboring connector tabs when the cover part is placed on the floor part and the isolating element is inserted into the opening.

2. A bus bar, said bus bar comprising:
(a) a floor part, said floor part further comprising at least two chambers for the accommodation of a terminal track, whereby between said at least two chambers a chamber separating wall is disposed, whereby connector tabs are disposed on said terminal track; and
(b) a cover part, said cover part being made from an isolating material;
(i) whereby said cover part can be placed on said floor part in such a manner that said terminal track is covered up and said connector tabs protrude through corresponding openings in said cover part; and
(ii) whereby said floor part, as well as said cover, part are manufactured by means of an extrusion process and said corresponding openings are subsequently placed, in particular stamped, into said cover part, characterized in that an isolating element, which is insertable into a one of said corresponding openings and which penetrates, in the inserted state, through said one of said corresponding openings and which features a case, disposed with which is at least one separating wall, which is positioned between two neighboring connector tabs when said cover part is placed on said floor part and said isolating element is inserted into said corresponding openings.

3. A bus bar according to claim 2, wherein said case features a lower edge that is insertable in one of said corresponding openings in an interlocking manner.

4. A bus bar according to claim 3, wherein in the inserted state of the isolating element, said case is disposed primarily on the exterior side of said cover part and said separating wall is disposed primarily on the interior side of said cover part.

5. A bus bar according to claim 2, wherein said separating wall features a length such that a lower edge, which faces away from said case, of said separating wall abuts against an edge of the of said terminal track that faces said case, when said cover part is placed on said floor part and said isolating element is inserted in said opening.

6. A bus bar according to claim 2, wherein in said separating wall a slit is provided in said separating wall, starting from a lower edge, into which said chamber separating wall engages when said cover part is placed on said floor part and said isolating element is inserted in said opening.

7. A bus bar according to claim 6, characterized in that said separating wall features a plurality of slits that wherein said plurality of slits corresponds to the number of said chamber separating walls.

8. A bus bar according to claim 2, characterized in that said separating wall engages with said chamber separating wall in an interlocking manner when said cover part is placed on said floor part and said isolating element is inserted in said opening.

9. A bus bar according to claim 2, wherein said cover part locks onto said floor part.

10. A bus bar according to claim 2, wherein said floor part is closable on said front side by means of at least two sealing caps.

11. A bus bar according to claim 2, wherein said cover part is closable on the front side by means of at least two sealing caps.

* * * * *